United States Patent [19]

Kardefeldt et al.

[11] Patent Number: 4,988,249
[45] Date of Patent: Jan. 29, 1991

[54] METHOD FOR FASTENING AN ATTACHMENT OR SUSPENSION DEVICE AND A DEVICE FOR CARRYING OUT THE METHOD

[75] Inventors: Björn Kardefeldt, Nyköping; Jan P. R. Tjäderhane, Oxelösund, both of Sweden

[73] Assignee: Thorsman & Co. Aktiebolag, Koping, Sweden

[21] Appl. No.: 187,450

[22] PCT Filed: Aug. 31, 1987

[86] PCT No.: PCT/SE87/00388
§ 371 Date: Apr. 25, 1988
§ 102(e) Date: Apr. 25, 1988

[87] PCT Pub. No.: WO88/02072
PCT Pub. Date: Mar. 24, 1988

[30] Foreign Application Priority Data

Sep. 12, 1986 [SE] Sweden .................. 8603847

[51] Int. Cl.⁵ ............................... F16B 21/14
[52] U.S. Cl. ................... 411/513; 411/502; 248/71; 248/217.2
[58] Field of Search ......... 411/502, 513–515, 411/522, 530; 248/71, 74.5, 217.2, 216.1; 29/432.1, 525.1

[56] References Cited

U.S. PATENT DOCUMENTS

| | | | |
|---|---|---|---|
| 170,740 | 12/1875 | Judd | 248/217.2 X |
| 2,901,200 | 8/1959 | Voeks | 248/71 |
| 3,298,651 | 1/1967 | Passer | 248/217.2 |

FOREIGN PATENT DOCUMENTS

| | | | |
|---|---|---|---|
| 640865 | 5/1962 | Canada | 411/502 |
| 1077284 | 3/1960 | Fed. Rep. of Germany | 248/71 |
| 3115914 | 11/1982 | Fed. Rep. of Germany | 248/71 |
| 521362 | 1/1977 | Japan | 411/502 |
| 85/3560 | 8/1985 | PCT Int'l Appl. | 248/71 |

Primary Examiner—Gary L. Smith
Assistant Examiner—Suzanne L. Dino
Attorney, Agent, or Firm—Ladas & Parry

[57] ABSTRACT

A method for fastening an attachment or suspension device to a porous support surface, preferably plasterboard, and also a device for carrying out the method. The device is secured to the support surface by means of fastener means, which preferably have a V-like configuration, the legs of which are driven through through-passing holes in the device attachment part. The holes have provided therein specially formed device parts which, when the fastener means is driven into the support surface, are operative in causing the legs of the fastener means to progressively diverge further within the support surface, such as to create force-absorbing crushed zones in abutment with the fastener legs.

13 Claims, 3 Drawing Sheets

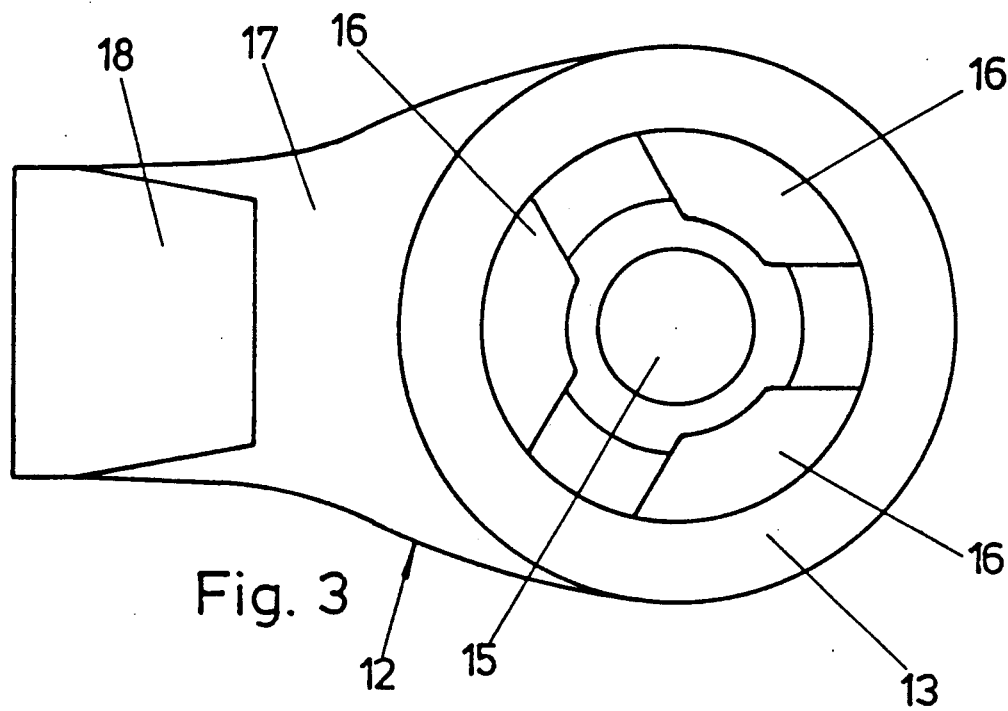
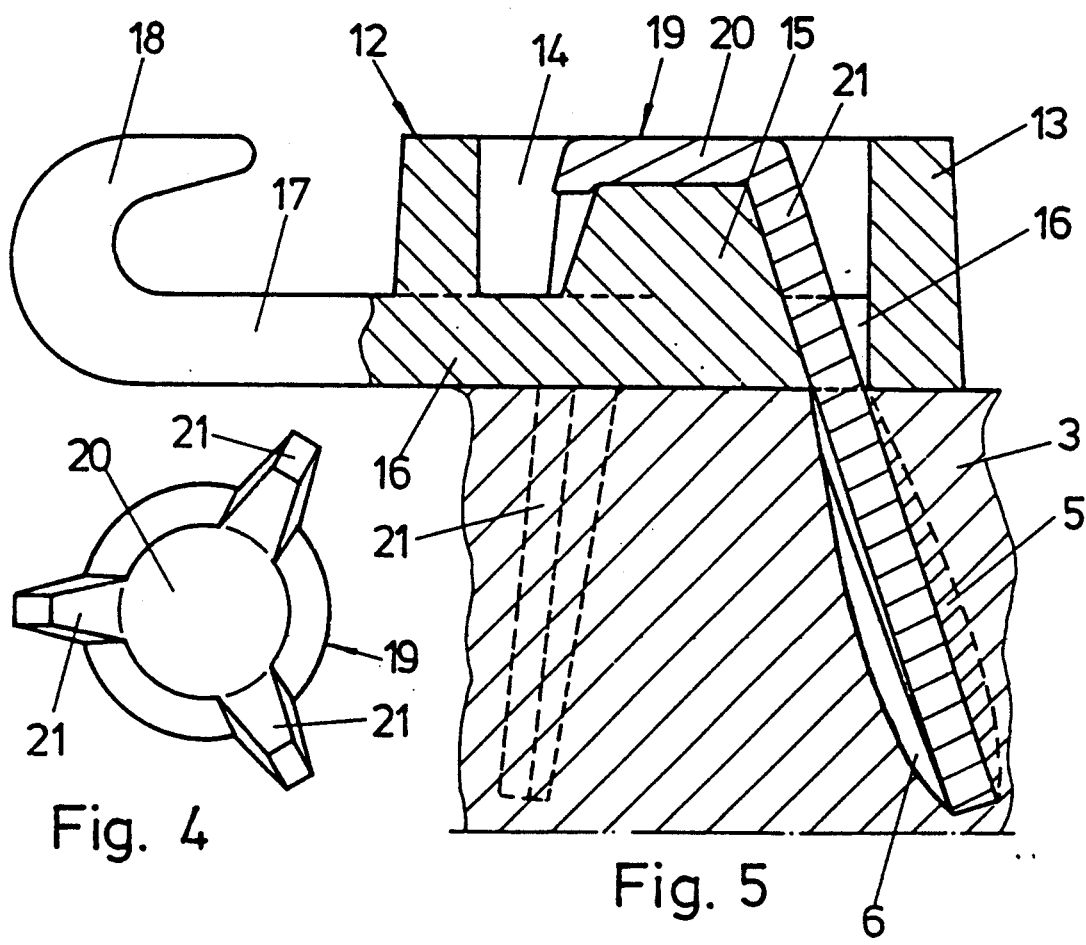

METHOD FOR FASTENING AN ATTACHMENT OR SUSPENSION DEVICE AND A DEVICE FOR CARRYING OUT THE METHOD

TECHNICAL FIELD

A method for fastening an attachment or suspension device to a porous support surface, preferably a plasterboard support surface, and an attachment device for carrying out the method.

BACKGROUND PRIOR ART

Because present day building materials are required to be resistant to both fire and mold, woodfiber board and chipboard is being replaced to an ever increasing extent with primarily plasterboard (gypsum).

Several methods and devices for fastening electric cables, paintings etc., to porous support surfaces, such as plasterboard panels, or for suspending devices on such surfaces are known to the art. Those methods which afford the most reliable attachment are based on the use of attachment devices comprising fasteners which pass through the panels, or on the use of special duty plaster screws or plugs. One drawback with such attachment devices is that they are difficult and time consuming to attach. Furthermore, such devices are relatively expensive. The quickest way of securing articles to such porous support surfaces is to use, inter alia, conventional attachment and suspension devices, such as nail clamps and X-hooks. Although these attachment devices are able to take up transversely acting loads in an acceptable manner, they are less than satisfactory with regard to taking up loads which act in a fastener-withdrawing direction. In order to obtain reliable attachment to the best possible extent when using attachment devices of this kind, it is desirable to locate the attachment devices in positions in which the fasteners used therewith will enter into an underlying stud or nogging-piece. When the articles to be attached in this way are electric cables, it is found necessary in some cases to extend the cables farther than would otherwise be required and, moreover, often in a manner which is less pleasing from an aesthetic point of view.

In order to enhance the ability of conventional attachment and suspension devices to take up such fastener-withdrawing forces satisfactorily, it has been proposed to skew-nail such devices to the support material, skew-nailing being a method in which nails are driven into the support material while inclined thereto. When skew-nailing, there has been used either two separate nails or a U-shaped fastener whose legs are caused to diverge or converge through the action of guides provided in the attachment device and/or are formed at their extremities in a manner which will ensure that the legs converge or diverge when driven into said support material. Both of these variants are disclosed in the German Offenlegungsschrift No. DE 3115914 A1, for example FIG. 9 of this publication illustrates an attachment device which is secured with the aid of two nails, whereas FIGS. 3 and 5 of the publication illustrate an attachment device which is fastened with the aid of a U-shaped fastener, this fastener being shown separately in FIG. 6.

Both of these fastener types have the drawback of relaxing their grip slightly when subjected to relatively small withdrawing forces, such that the attaching device will no longer abut the support surface. This is due to the fact that the bearing surface of the fastener means which takes up the withdrawing forces is relatively small in area, and consequently the surface pressure thereon becomes so high as to crush the underlying brittle support material. As the attachment device moves, this crushed material becomes packed forwardly of the fastener means in the withdrawing direction thereof and forms cushions or crushed-zones which are able to withstand the withdrawing forces to a greater extent than the unaffected material and therewith prevent continued withdrawal of the fastener means used to fasten the attachment device. When these withdrawing forces cease, the attachment device will return, either partially or fully, to its original position. Furthermore, the crushed material in the fastener holes of the attachment device is often redistributed so that upon the reoccurrence of such withdrawing forces further material is crushed. Should these withdrawing forces be repeated intermittently, the fastener means will gradually work out of the support surface and the attachment will become progressively looser, until it falls away. These intermittently occurring forces which tend to withdraw the fasteners may be caused as a result of cleaning or dusting externally fitted cables of various kinds, for example. When the attachment device is used to hang paintings, pictures, or mirrors in the vicinity of doors, such withdrawing forces may occur intermittently as a result of closing the door. For example, the surges of air generated when closing the door are liable to cause the painting, etc., to rock and thereby subject the fasteners to withdrawing forces.

SUMMARY OF THE INVENTION

The object of the invention is to provide a method and a device therefor which will overcome the aforedescribed difficulties. This object is achieved with the aid of fastener means which are so formed that when applied they are caused to expand within the support surface, such as to create crushed zones which improve the ability of the fastener means to take-up load.

BRIEF DESCRIPTION OF THE DRAWINGS

The invention will now be described in more detail with reference to the accompanying drawings, in which FIG. 3 is a plan view of a further embodiment, in the form of an attachment device provided with a hook; FIG. 4 is a bottom plan view of a three-legged fastener means; and FIG. 5 illustrates in side view and partially in section the suspension device of FIG. 3 in cooperation with the fastener means of FIG. 4.

Detailed Description of Preferred Embodiments According to the Invention

Figure 1:
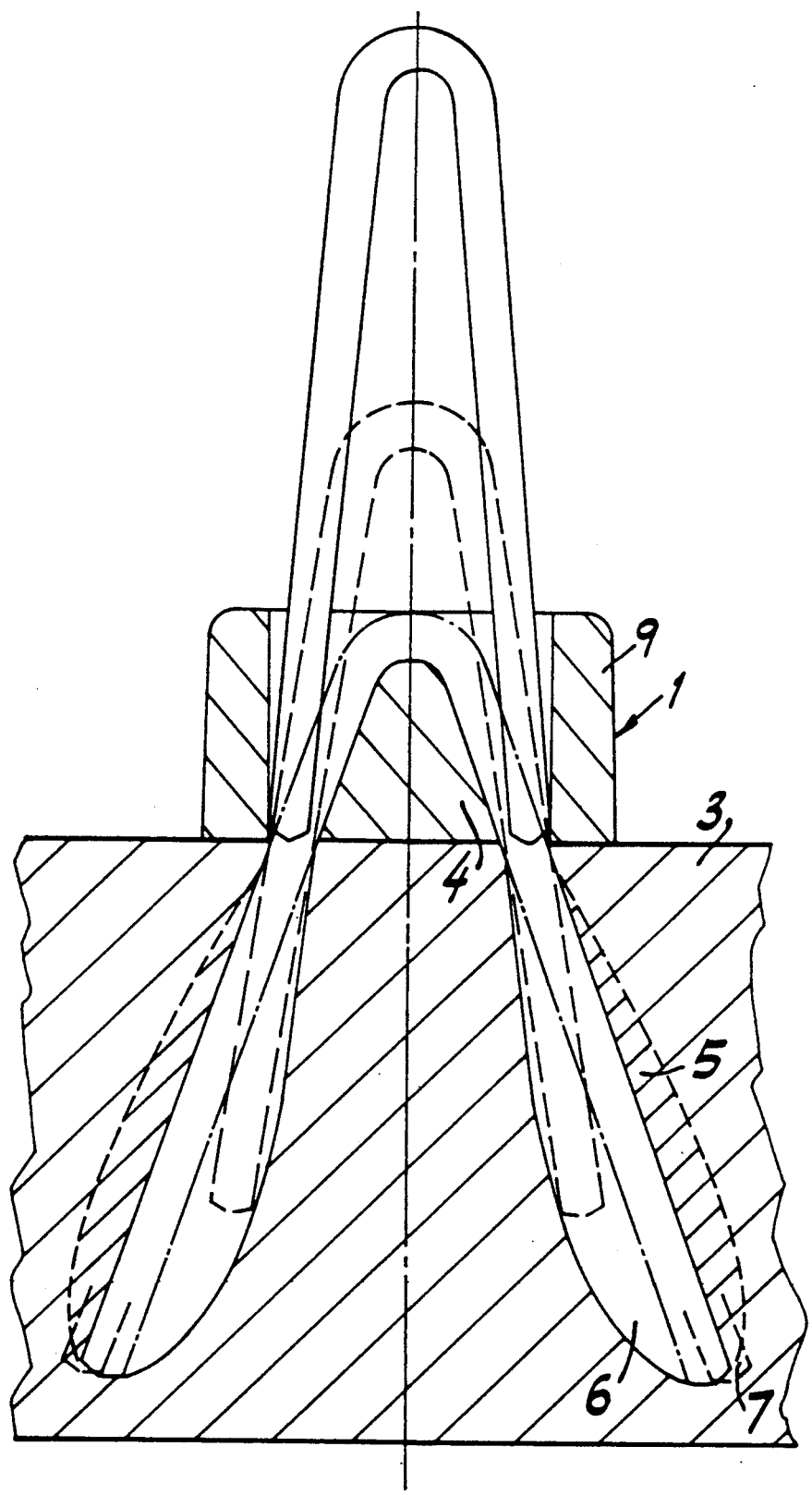
FIG. 1 is a sectional view of an attachment device and co-acting fastener means, shown in various when securing the device to a support surface.

FIG. 1 illustrates in section an attachment or suspension device which is preferably made of a plastics material and which co-acts with a V-shaped fastener means 2, the fastener means being shown in its various stages when securing the attachment device to a support surface 3. For space reasons, FIG. 1 has been divided into two halves, which have been displaced relative to one another. The left-hand part of FIG. 1 shows, in full lines, the V-shaped fastener means 2 positioned in the attachment device 1 prior to driving the fastener means into the support surface 3, which may comprise plasterboard or like material. The fastener means is made from a hard material, preferably steel, whose hardness has been further enhanced by cold working when bending the fastener means to its V-shape. The distance between the points of the legs of the fastener means 2 is adapted to the length of the base of a trapezoidal shaped part 4 incorporated in the attachment device 1, said trapezoidal shaped part 4 being intended to cause the fastener legs to diverge progressively still further as the fastener means is driven into the support surface. As the fastener legs diverge and the angle therebetween increases, the legs will enlarge or widen the holes caused by preceding leg parts during the entry of the legs into the support surface 3. The fastener is shown in dotted lines on intermediate stage of a fastener driving operation. The fasting is illustrated in chain-dotted lines fully driven into the support surface 3. As illustrated in FIG. 1, the lateral movement executed by the fastener legs causes the holes 6 made by the legs to widen considerably. In this way, the material located in the wall of each hole 6 is crushed in the aforesaid direction of lateral movement, to form a crushed zone 5 in which the material is packed together so as to create a cushion which transfers the laterally acting force from the fastener means 2 to the support surface 3 and spreads the force to a larger area around the fastener means and therewith produces the same effect as that which would be produced if the force take-up surface of the fastener means was enlarged. When compared with a fastener means of the kind in which the fastener legs are replaced with nails which are of the same length and diameter and which are skew-nailed into the support surface at angles corresponding to fully driven-in legs, the force required to loosen the inventive attachment device and fastener means, i.e. the withdrawing force, is several times greater.

The reference numeral FIG. 1 identifies the tip of the leg of a fastener means which has been driven fully into the support surface and illustrates the position which the fastener leg would have taken if the leg had not encountered a progressively increasing resistance from the crushed zone during lateral movement of the leg as it is driven into said support surface. As a result of this resistance the part 4 of the attachment device is deformed to some extent and the fastener leg undergoes a certain degree of elastic deformation and therefore becomes pre-stressed, such as constantly to hold the crushed zone under pressure and therewith also to hold the attachment device 1 in close abutment with the support surface 3. This pressure is not found in the case of devices which are skew-nailed, which is the reason why the fastener means of such devices tend to "eat" their way out of the support surface when subjected to intermittent loads, as beforementioned. Neither is this effect obtained with known attachment devices of the kind which are intended to co-act with slender and relatively soft U-shaped fasteners, whose legs are guided in holes or grooves in the attachment device so as to enter the support surface at an inclined angle, corresponding to skew-nailing, or with which the end surfaces of the fastener legs are formed so as to produce a corresponding effect.

Figure 2:
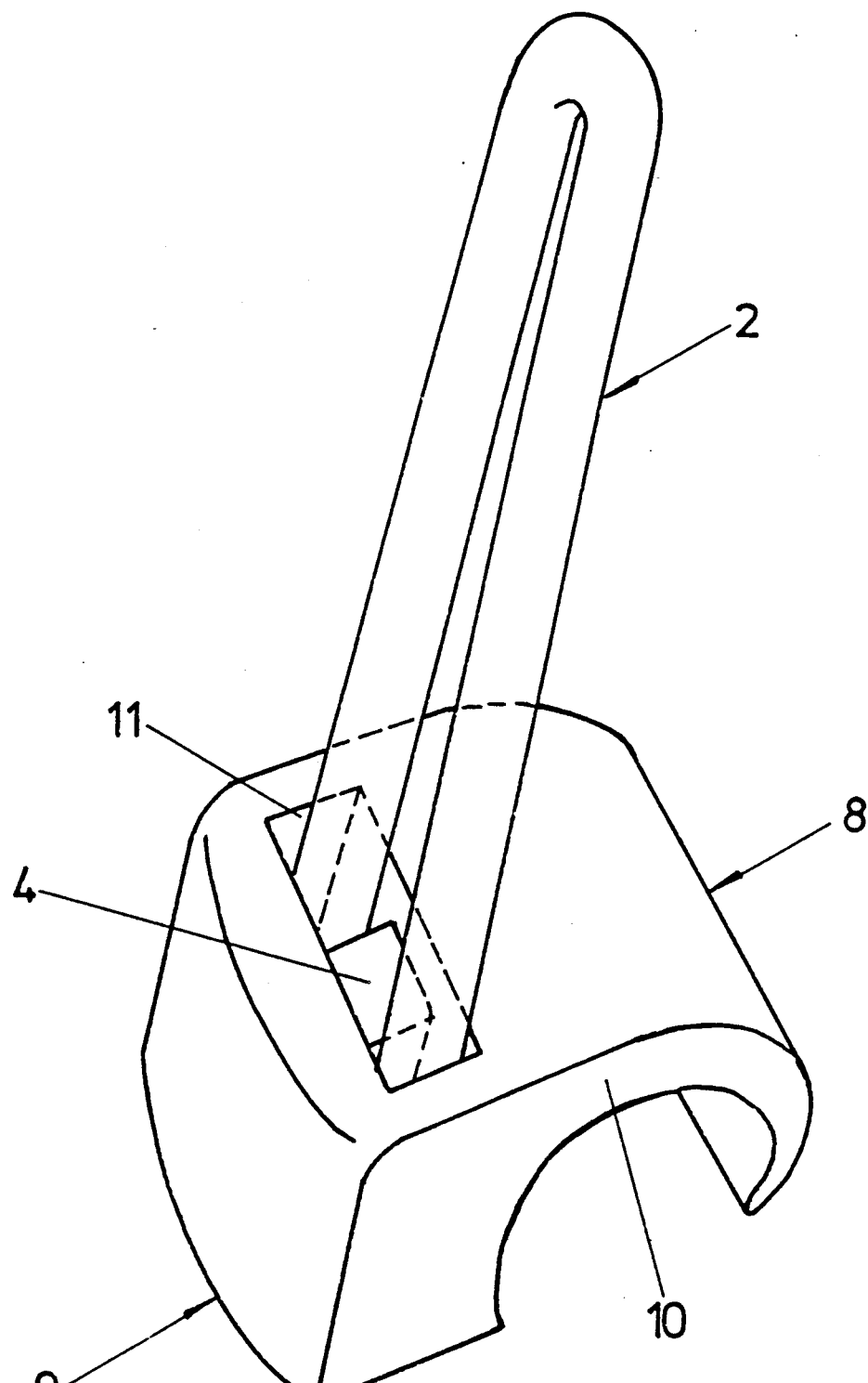
FIG. 2 illustrates in perspective an embodiment which has the form of a cable clip with associated V-shaped fastener means.

FIG. 2 is a perspective view of a cable clip 8 which is preferably made of a plastic material and which is intended to be fastened to the support surface with the aid of V-shaped fastener 2. The clip includes an attachment part 9 which has an essentially flat undersurface for abutment with the support surface, and also an arm 10 which extends from the attachment part 9 and which is intended to grip around a cable or the like to be attached to the support surface. The fastener 2 is placed in a rectangular, through-passing hole 11 which has located centrally therein trapezoidal shaped part 4 which is arranged in the manner illustrated in FIG. 1, such that the upper surface of said part is located beneath the upper surface of the attachment part 9 to such an extent that when the fastener means 2 is brought into abutment with the upper surface of the part 4 as the fastener means is driven into the support surface, the upper edge of the fastener 2 will lie parallel with the upper surface of the attachment part 9. These cable clips are suited for use with any kind of fastener applicator or nail driving pistol, the clips, in this case, preferably being produced in a long, continuous strip. In this regard, the fastener means are placed in respective clips prior to inserting the clips into the pistol magazine, or alternatively the fastener means can be placed in a separate magazine and inserted in the clips in conjunction with firing the clips from the applicator or pistol.

The V-shaped fastener means is preferably manufactured from spring steel and the fastener part joining the fastener legs preferably has a radius of curvature which is equal to or smaller than the diameter of the wire from which the fastener means is made. The trapezoidal-shaped part 4 has an upper surface which is essentially flat. When the fastener means is driven into the support surface, and therewith into abutment with said upper surface, the corners of the trapezoidal-shaped part are subsequently deformed to some extent, therewith exerting a gentle retardation force to the fastener means.

FIG. 3 is a plan view and FIG. 5 a side view, partly in section, of an embodiment of the invention comprising a suspension device 12 which includes a circular attachment part 13 having a centrally located circular hole 14, in which a hub 15 in the shape of a truncated cone is arranged with the base surface of the cone in the plane of the surface of the attachment part 13 intended for abutment with the support surface and connected to the defining wall of the hole by means of three spokes 16, and which further includes an arm 17 which extends from the attachment part 13 and which is also intended for abutment with the support surface, the end part of the arm 17 merging with a hook 18. FIG. 5 illustrates the suspension device 12 in co-action with a fastener means 19 which comprises a base part 20 having extending therefrom three legs 21 which are placed in the openings located between respective spokes 16 when fastening the suspension device 12 to a support surface 3. When the fastener legs 21 are driven into the support surface 3, the legs are caused to diverge within the confines of the support surface, such as to create crushed zones on mutually opposing sides of the legs 21, in the manner aforedescribed. FIG. 4 is a bottom plan view of the fastener means 19, separate from the attachment device. The fastener means concerned is punched from sheet steel and the fastener legs are then bent while simultaneously cold working or bossing the device.

The fastening reliability of the described suspension device and attachment device, and the method applied therewith, is greatly superior to the fastening reliability of conventional methods and devices when the length of the fastener means is at least 2.5, preferably 3.5–4 times the height of the trapezioidal-shaped part, and when the angle defined by the fastener legs with the symmetry line of the attachment device is greater than 8°, and if possible at least 11°. The length of the fastener means in relation to that part of the device which causes the device to expand in the support surface, and also the extent of such divergence, can be varied within relatively wide limits without departing from the scope of the invention.

What is claimed is:

1. A fastening method comprising placing an attachment or suspension device on a porous support, the device having a fastener projecting from the device and provided with diverging legs straddling a tapered part, the legs having piercing ends abutting against the surface of the porous support in a space around the tapered part and driving the fastener inwardly into the porous surface while concurrently increasing progressively the angle of divergence of the legs as the legs advance on said tapered part so that as said legs progressively penetrate into the porous support the legs are caused to turn outwardly and widen the hole formed by the penetration of legs into the porous support and laterally crush the material of the porous support.

2. A method as claimed in claim 1 wherein initially the angle of divergence of the legs of the fastener is less than the angle of taper of the tapered part, and after the fastener is driven completely inwards the legs abut against and have an angle of divergence conforming to the tapered part, the angle at which the legs penetrate into the porous support progressively varying between the initial and final angles.

3. A method as claimed in claim 2 wherein the penetration of the ends of the legs takes place with axial and turning movements to produce a prestress in the fastener.

4. An attachment or suspension device for being secured to a porous support comprising an attachment part having a flat surface for abutment against a porous support, said attachment part including a tapered part with an open region around said tapered part, and a fastener including two divergently inclined legs straddling said tapered part and having piercing ends disposed in said open region in the vicinity of said flat surface, said legs having an angle of divergence which is less than the angle of said tapered part, said open region having a lateral extent greater than that of said legs and sufficient to permit the angle between the legs of the fastener to increase as the legs penetrate into the porous support and enable the legs concurrently to turn outwardly and progressively widen the hole formed by the penetration of the legs into the support and cause lateral outward crushing of the material of the support.

5. A device as claimed in claim 4 wherein said tapered part is trapezoidal and said fastener is V-shaped.

6. A device as claimed in claim 4 wherein said tapered part has an outer conical surface conical and said fastener has three legs.

7. A device as claimed in claim 6 wherein said attachment part includes a radial arm, said open region being provided by three openings into which said three legs are respectively positioned, said fastener including a base part from which said legs extend.

8. A device as claimed in claim 7 wherein said attachment part includes an annular portion surrounding said base part.

9. A device as claimed in claim 4 wherein said attachment part is made of plastic material and said fastener is made of steel.

10. An attachment or suspension device for being secured to a porous support comprising an attachment part having a flat surface for abutment against a porous support, said attachment part having a through opening therein, and a fastener projecting from said attachment part and including two divergently inclined legs extending into said opening, and means in said attachment part bounded by said through opening for causing said inclined legs of the fastener to penetrate into the porous support, when the fastener is driven into the attachment part, with an axial movement and a concurrent progressively outward bending movement to produce lateral crushing of the material of the porous support.

11. A device as claimed in claim 10 wherein said means includes a tapered part and an opening means therearound, said legs of said fastener being engaged in said opening means.

12. A device as claimed in claim 11 wherein said legs straddle said tapered part and have piercing ends initially disposed at the level of the flat surface of the attachment part, said legs having an angle of divergence which is less than the angle of the tapered part.

13. A device as claimed in claim 10 wherein said attachment part is made of plastic material and said fastener is made of steel.

* * * * *